(12) United States Patent
Abramson et al.

(10) Patent No.: US 8,014,501 B2
(45) Date of Patent: Sep. 6, 2011

(54) DETERMINING WHETHER TO PROVIDE AUTHENTICATION CREDENTIALS BASED ON CALL-ESTABLISHMENT DELAY

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1166 days.

(21) Appl. No.: 11/563,673

(22) Filed: Nov. 27, 2006

(65) Prior Publication Data

US 2008/0123825 A1    May 29, 2008

(51) Int. Cl.
*H04M 11/00* (2006.01)
(52) U.S. Cl. .................................. 379/93.02
(58) Field of Classification Search ............. 379/93.02
See application file for complete search history.

(56) References Cited

U.S. PATENT DOCUMENTS

| | | | |
|---|---|---|---|
| 5,978,687 A | 11/1999 | Maenpaa | |
| 6,393,017 B1 | 5/2002 | Galvin et al. | |
| 6,590,964 B1 * | 7/2003 | Nire | 379/67.1 |
| 6,731,731 B1 | 5/2004 | Ueshima | |
| 6,775,272 B2 * | 8/2004 | Galvin et al. | 370/352 |
| 6,882,725 B2 * | 4/2005 | Ko | 379/265.09 |
| 6,904,141 B2 | 6/2005 | Jijina et al. | |
| 7,054,418 B2 | 5/2006 | Muller | |
| 7,298,833 B2 * | 11/2007 | Klein et al. | 379/201.02 |
| 7,555,110 B2 * | 6/2009 | Dolan et al. | 379/211.02 |
| 2005/0078810 A1 * | 4/2005 | Cromwell et al. | 379/188 |
| 2007/0121921 A1 * | 5/2007 | Silver | 379/376.02 |

FOREIGN PATENT DOCUMENTS

| | | |
|---|---|---|
| CA | 2464815 A1 | 10/2005 |
| EP | 0926866 A2 | 6/1999 |
| GB | 2314482 A | 12/1997 |

OTHER PUBLICATIONS

Courtenay, Dr. Andrew, "GB Application No. 0723259.8 Exam Report Jun. 3, 2009",, Publisher: UK IPO, Published in: GB.
Dr. Andrew Courtenay, "GB Application No. GB0723259.8 Exam Report", Jan. 9, 2009, Publisher: IPO, Published in: GB.
Dr. Andrew Courenay, "Combined Search and Examination Report", Feb. 27, 2008, Publisher: UK IPO, Published in: GB.

* cited by examiner

*Primary Examiner* — Curtis Kuntz
*Assistant Examiner* — Maria El-Zoobi
(74) *Attorney, Agent, or Firm* — Maldjian Law Group LLC; John P. Maldjian

(57) ABSTRACT

A method of authenticating an authorized entity via the telephone network is disclosed. A telephone call is placed from a telecommunications terminal to a server that comprises a valuable resource and that only provides the resource to authorized entities. When the terminal has already demonstrated its authorization to the server, the server indicates to the terminal that the terminal need not provide its authorization credentials. In contrast, when the terminal has not yet demonstrated its authorization to the server, the server indicates to the terminal that the terminal does need to provide its authorization credentials. The server indicates to the terminal whether or not it needs to provide its authorization credentials by deliberating waiting to establish the call with the terminal, wherein in the length of the wait is indicative of whether or not the terminal needs to provide its authorization credentials.

3 Claims, 2 Drawing Sheets

Telecommunications System 100

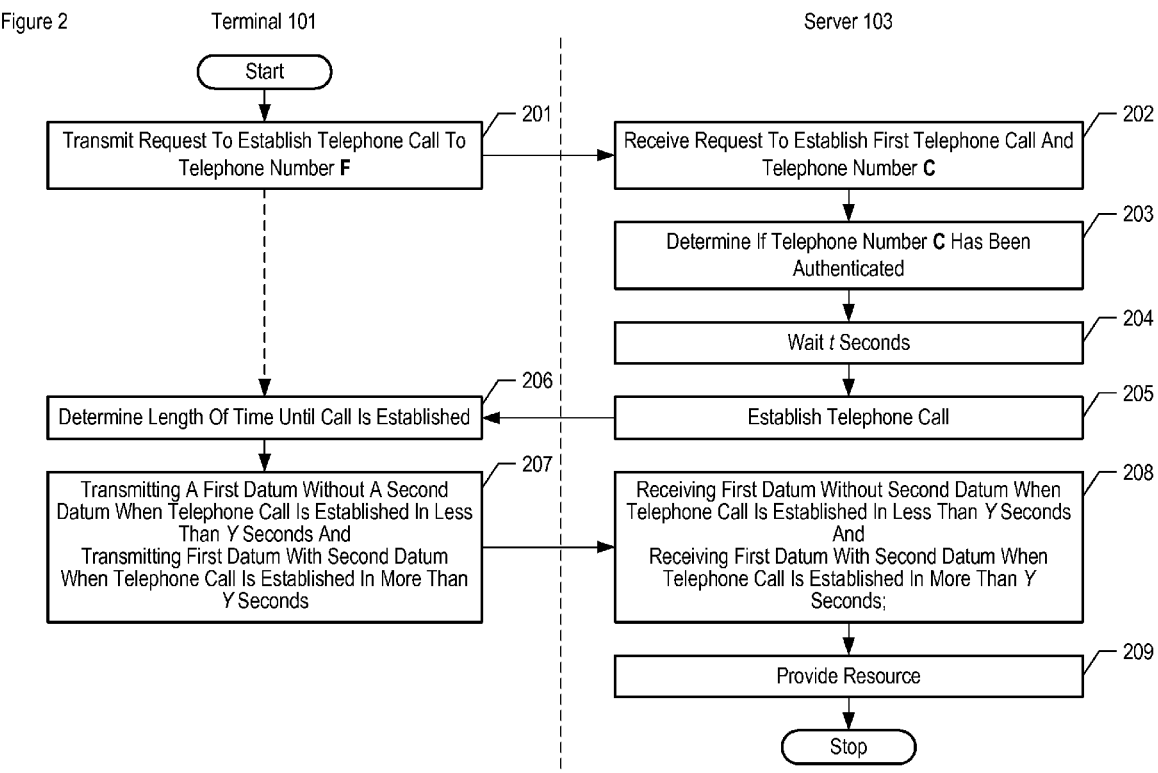

DETERMINING WHETHER TO PROVIDE AUTHENTICATION CREDENTIALS BASED ON CALL-ESTABLISHMENT DELAY

FIELD OF THE INVENTION

The present invention relates to telecommunications in general, and, more particularly, to cryptography.

BACKGROUND OF THE INVENTION

Some resources are finite and valuable and access to them is limited to prevent them from being wasted. Typically, some entities are authorized to access and use the resources whereas other entities are not. When a resource is accessible via the telephone network, the entity seeking access to the resource must demonstrate that it is authorized to access the resource to the entity that guards the resource. The process by which an entity demonstrates its authorization to access a resource is called authentication.

Although there are many methods in the prior art for authenticating an entity via the telephone network, they have disadvantages, and, therefore, the needs exists for more advantageous methods.

SUMMARY OF THE INVENTION

The present invention provides a method for guarding a resource that is accessible via a telephone network. In accordance with the illustrative embodiment of the present invention, a telecommunications terminal (e.g., cellular telephone, personal digital assistant, computer telephony application, etc.) desires access to a resource that is guarded by a server. When the server believes that the terminal is authorized to access the resource, the server summarily grants the terminal access to the resource. In contrast, when the server does not believe that the terminal is authorized to access the resource, the server first requires that the terminal provide an "authorization credentials" to the server—to evince the terminal's authority to access the resource—before the server grants the terminal access to the resource.

In accordance with the illustrative embodiment, the authorization credentials involves an interactive and bi-directional challenge-response authentication protocol, but it will be clear to those skilled in the art, after reading this disclosure, how to make and use alternative embodiments of the present invention in which the authorization credentials is anything else (e.g., a simple password, etc.). In accordance with the illustrative embodiment, the process of providing the authorization credentials is computationally burdensome to both the terminal and to the server, and, therefore, the process is only performed when the server requires it.

In accordance with the illustrative embodiment, the terminal and the server have a protocol for informing the terminal when it must provide and when it need not provide its authorization credentials to the server. In accordance with the illustrative embodiment, the protocol is as follows.

First, the terminal transmits a request to establish a telephone call to the server. As part of the request, the telephone number of the terminal is transmitted to the server.

Second, the terminal begins to measure the amount of time that elapses since it transmitted the request. The reason for this will be explained below.

Third, the server receives the request to establish the telephone call and the telephone number of the terminal, but does not immediately grant the request to establish (i.e., "answer") the call even though it could.

Fourth, the server determines whether or not the terminal must provide its authorization credentials in order to access the resource. Because the terminal's telephone number was received by the server in the third step, the server knows the identity of the terminal, and, therefore, can make an intelligent decision whether or not the terminal must provide its authorization credentials based on the terminal's identity. When the server wants the terminal to provide its authorization credentials, the server deliberately waits t>Y seconds before it grants (i.e., "answers") the request to establish the telephone call. In contrast, when the server does not want the terminal to provide its authorization credentials, the server waits t<Y seconds before it grants the request to establish the telephone call.

Fifth, the terminal learns that the request to establish the telephone call has been granted and completes the measurement of the amount of time that had elapsed since it transmitted the request. If the amount of time is greater than Y, the terminal understands that the server wants it to provide its authentication credentials; otherwise the terminal understands that the server does not want it to provide its authentication credentials. In this way, the server informs the terminal whether or not it wants the authentication credentials as part of establishing the telephone call, rather than as part of the telephone call itself.

The illustrative embodiment comprises receiving (i) a request to establish a telephone call from a first terminal at a server and (ii) a first telephone number of the first terminal; and waiting to establish the telephone call for t seconds after receiving the telephone call, wherein t is an real scalar that is based, at least in part, on the first telephone number of the first terminal.

BRIEF DESCRIPTION OF THE DRAWINGS

FIG. 2 depicts a flowchart of the salient tasks performed by the illustrative embodiment of the present invention.

DETAILED DESCRIPTION

Figure 1:
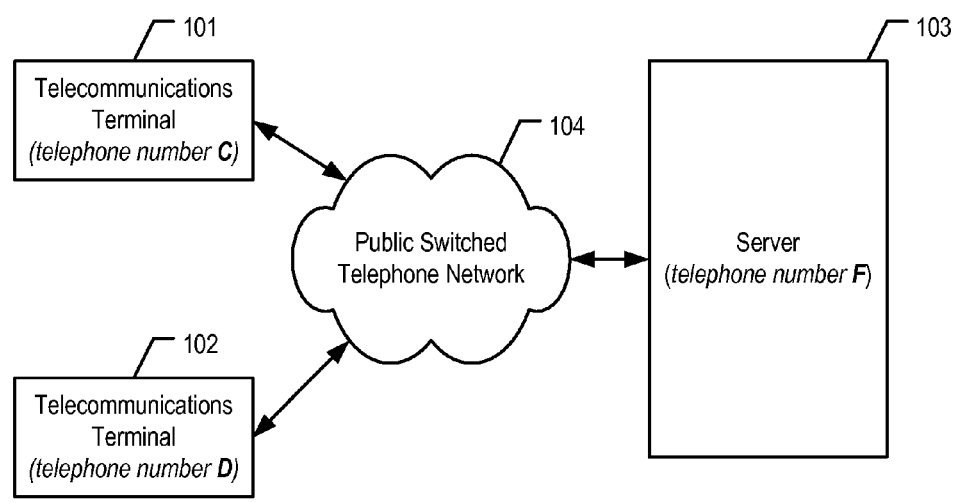
FIG. 1 depicts a schematic diagram of the salient components of telecommunications system 100 in accordance with the illustrative embodiment of the present invention.

Telecommunications System 100—FIG. 1 depicts a schematic diagram of the salient components of telecommunications system 100 in accordance with the illustrative embodiment of the present invention. Telecommunications system 100 comprises: telecommunications terminal 101, telecommunications terminal 102, server 103, and Public Switched Telephone Network 105, which are interconnected as shown.

Although the illustrative embodiment comprises two telecommunications terminals and one telecommunications switch it will be clear to those skilled in the art, after reading this disclosure, how to make and use alternative embodiments of the present invention that comprise any number of telecommunications terminals and any number of telecommunications switches.

Telecommunications terminal 101 is a wireless terminal (e.g., cellular telephone, personal digital assistant, etc.) that is capable of performing the functionality described below and in the accompanying figures. It will be clear to those skilled in the art, after reading this disclosure, how to make and use alternative embodiments of the present invention in which telecommunications terminal 101 is a wireline terminal (e.g., computer-telephony application, etc.).

Telecommunications terminal 101 is associated with telephone number C in the address space of Public Switched Telephone Network 104. It will be clear to those skilled in the art, after reading this disclosure, how to make and use alternative embodiments of the present invention in which telecommunications terminal 101 is associated with a telephone number in the address space of another telecommunications network. It will be clear to those skilled in the art, after reading this disclosure, how to make and use telecommunications terminal 101.

Telecommunications terminal 102 is a wireless terminal (e.g., cellular telephone, personal digital assistant, etc.) that is capable of performing the functionality described below and in the accompanying figures. It will be clear to those skilled in the art, after reading this disclosure, how to make and use alternative embodiments of the present invention in which telecommunications terminal 102 is a wireline terminal (e.g., computer-telephony application, etc.).

Telecommunications terminal 102 is associated with telephone number D in the address space of Public Switched Telephone Network 104. It will be clear to those skilled in the art, after reading this disclosure, how to make and use alternative embodiments of the present invention in which telecommunications terminal 102 is associated with a telephone number in the address space of another telecommunications network. It will be clear to those skilled in the art how to make and use telecommunications terminal 102.

Server 103 is a switch that is capable of performing the functionality described below and in the accompanying figures. It will also be clear to those skilled in the art, after reading this disclosure, how to make and use alternative embodiments of the present invention in which server 103 is a device other than a switch (e.g., a private-branch exchange, a telecommunications terminal, an answering machine, a home-automation appliance, a security system, etc.).

Server 103 is associated with telephone number F in the address space of Public Switched Telephone Network 104. In accordance with the illustrative embodiment, server 103 comprises a resource that is available to terminal 101. In accordance with the illustrative embodiment, the resource (i) accepts a telephone number D and (ii) establishes a call between terminal 101 and terminal 102 in such a way that the telecommunications line charges are assessed against server 103 rather than against telecommunications terminal 101. It will be clear to those skilled in the art, after reading this disclosure, how to make and use alternative embodiments of the present invention in which the resource is something else.

Before server 103 will provide the resource, server 103 requires that telecommunications terminal 101 authenticate itself. This is described in detail below and in the accompanying figures. It will be clear to those skilled in the art, after reading this disclosure, how to make and use server 103.

Public Switched Telephone Network 104 is the public telephone network as is well known to those skilled in the art.

Operation of the Illustrative Embodiment—FIG. 2 depicts a flowchart of the salient tasks performed by the illustrative embodiment of the present invention.

At task 201, telecommunications terminal 101 transmits a request, via Public Switched Telephone Network 104, to establish a telephone call to telephone number F. As part of task 201, telecommunications terminal 101 begins measuring the length of time, t, where t is a real scalar, that elapses between the transmission of the request and the establishment of the call. It will be clear to those skilled in the art how to make and use embodiments of the present invention that perform task 201.

At task 202, server 103 receives:
i. the request to establish the telephone call, and
ii. the telephone number of telecommunications terminal 101 (i.e., telephone number C).

It will be clear to those skilled in the art how to make and use embodiments of the present invention that perform task 202.

At task 203, server 103 determines if the telephone number of telecommunications terminal 101 has been previously authenticated by server 103. In accordance with the illustrative embodiment, server 103 performs this by looking up telephone number C in a table of authenticated telephone numbers. An example of such a table is depicted in Table 1a.

TABLE 1a

| (Before Authentication of Terminal 101) Authenticated Telephone Numbers |
| --- |
| 732-555-2323 |
| 653-658-2323 |
| . . . |
| 456-222-4323 |

It will be clear to those skilled in the art how to make and use embodiments of the present invention that perform task 203.

At task 204, server 103 intentionally waits t seconds before proceeding to task 205. In accordance with the illustrative embodiment, server 103 chooses the magnitude of t and bases it on the authentication status of terminal 101. If telephone number C has been previously authenticated by server 103, then the magnitude of t is chosen to be less than a threshold magnitude Y (e.g., 10 seconds, etc.); otherwise the magnitude of t is chosen to be greater than the threshold magnitude Y. In other words, server 103 chooses the magnitude of t to inform terminal 101 of whether or not it has been previously authenticated by server 103, and, therefore, whether or not terminal 101 needs to provide its authorization credentials as part of the ensuing telephone call.

In accordance with the illustrative embodiment, the magnitude of the threshold is substantially longer than the sum of the times required to perform tasks 202, 203, and 205. This ensures that the value of t as measured by terminal 101 correctly represents the information conveyed by server 103 in task 204.

It will be clear to those skilled in the art, after reading this disclosure, how to make and use alternative embodiments of the present invention in which the magnitude of t is chosen to be greater than a threshold magnitude Y (e.g., 10 seconds, etc.) when telephone number C has been authenticated, and in which the magnitude of t is chosen to be less than the threshold magnitude Y when it is not. Furthermore, it will be clear to those skilled in the art, after reading this disclosure, how to make and use alternative embodiments of the present invention in which the magnitude of t is chosen to represent a string that server 103 desires to convey to terminal 101 as part of the establishment of the call. It will be clear to those skilled in the art, after reading this disclosure, how to make and use embodiments of the present invention that perform task 204.

At task 205, server 103 establishes the call with terminal 201, in well-known fashion.

At task 206, terminal 101 finishes measuring the length of time that has elapsed between the transmission of the request and the establishment of the call (i.e., the magnitude of t) to a level of precision such that the length of time required to perform tasks 202, 203, and 205 are inconsequential. It will be clear to those skilled in the art how to make and use embodiments of the present invention that perform task 206.

At task 207, terminal 101 transmits, as part of the telephone call, a first datum without a second datum when t is less than the threshold Y, and transmits the first datum with the second datum when t is greater than the threshold Y. In accordance with the illustrative embodiment, the first datum is telephone number D and the second datum comprises the authorization credentials for terminal 101. The authorization credentials is the information that terminal 101 uses to evince that terminal 101 is authorized to access the resource. It will be clear to those skilled in the art, after reading this disclosure, how to make and use embodiments of the present invention that perform task 207.

At task 208, server 103 receives, as part of the telephone call, the first datum without the second datum when t is less than the threshold Y, and receives the first datum with the second datum when t is greater than the threshold Y. When server 103 receives the authorization credentials, server 103 uses it to authenticate terminal 101. When server 103 authenticates terminal 101, server 103 adds telephone number C to the table of authenticated telephone numbers so that terminal 101 need not provide its authorization credentials again.

An example of such a table is depicted in Table 1b.

TABLE 1b

| Deleted: Authenticated |
| --- |
| (After Authentication of Terminal 101) |

| Authenticated Telephone Numbers |
| --- |
| 732-555-2323 |
| Telephone Number C |
| 653-658-2323 |
| ... |
| 456-222-4323 |

It will be clear to those skilled in the art, after reading this disclosure, how to make and use embodiments of the present invention that perform task 208.

At task 209, server 103 provides the resource to terminal 101, which in accordance with the illustrative embodiment involves the establishment of a call to terminal 102 in such a way that the telecommunications line charges are assessed against server 103 rather than against telecommunications terminal 101. It will be clear to those skilled in the art how to make and use embodiments of the present invention that perform task 209.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising:
   receiving by a data-processing system a request from a terminal to establish a call;
   establishing said call, in response to said request, after a delay of t seconds, wherein t is a positive real number, and wherein the value of t is based on whether or not said terminal is authorized to access a resource of said data-processing system; and
   when, and only when, the value of t exceeds a threshold Y, receiving by said data-processing system an authorization credential from said terminal;
   wherein said terminal is never prompted for said authorization credential, irrespective of the value of t; and
   wherein exceedance of said threshold Y indicates to said terminal to transmit said authorization credential; and
   wherein Y is a positive real number.

2. A method comprising:
   transmitting by a terminal at time t a request to establish a call;
   receiving by said terminal at time t+δ a signal that indicates that said call has been established, wherein δ is a positive real number; and
   when, and only when, δ exceeds a positive threshold, transmitting by said terminal an authorization credential;
   wherein said terminal is never prompted for said authorization credential; and
   wherein exceedance of said positive threshold indicates to said terminal to transmit said authorization credential.

3. The method of claim 2 further comprising receiving by said terminal a response to said authorization credential that indicates whether or not said terminal is authorized to access a resource.

* * * * *